United States Patent [19]

Mennuto

[11] E Re. 29,581

[45] Reissued Mar. 21, 1978

[54] DOOR ASSEMBLY INCLUDING SIMPLIFIED INSERT SUPPORTING MEANS

[76] Inventor: Anthony R. Mennuto, 769 Pascack Rd., Paramus, N.J. 07652

[21] Appl. No.: 641,338

[22] Filed: Dec. 16, 1975

Related U.S. Patent Documents

Reissue of:

[64] Patent No.: 3,878,649
Issued: Apr. 22, 1975
Appl. No.: 434,121
Filed: Jan. 17, 1974

[51] Int. Cl.[2] ..... E06B 3/00

[52] U.S. Cl. ..... 49/501

[58] Field of Search ..... 49/501, 62, 463, 465; 160/90, 89

[56] References Cited

U.S. PATENT DOCUMENTS

| | | | |
|---|---|---|---|
| 2,316,442 | 4/1943 | Lootens | 49/62 |
| 3,599,703 | 3/1969 | Mennuto | 160/90 |

*Primary Examiner*—Kenneth Downey
*Attorney, Agent, or Firm*—Anthony F. Cuoco

[57] ABSTRACT

A door assembly includes a pair of panels having portions arranged in spaced relation to each other, and which portions surround an opening in the door. One of the panels supports a removable insert behind the opening and a weatherproofing gasket is arranged in the space between the panel portions and adjacent the insert for providing a simplified yet decorative door assembly.

21 Claims, 4 Drawing Figures

DOOR ASSEMBLY INCLUDING SIMPLIFIED INSERT SUPPORTING MEANS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to doors of the type including a pair of panels having portions surrounding an opening and supporting removable inserts. More particularly, this invention relates to a door of the type described wherein means are provided for supporting the inserts behind the opening to provide a door which is simple in construction yet decorative in nature.

2. Description of the Prior Art

Doors of the type including a pair of panels having portions in spaced relation to each other and having removable screen and glass inserts are described in U.S. Pat. No. 3,599,703 issued on Aug. 17, 1971 to A. Mennuto and N. Popovich and an improvement thereon described in U.S. Pat. No. 3,727,664 issued on Apr. 17, 1973 to A. Mennuto. These doors feature a core which separates the panels and a rigid frame which defines an opening in the door, and which frame is adapted for receiving the removable inserts. The frame and inserts cooperate to retain a decorative insert such as a scalloped edging or the like. Doors of this type are intended for a select market. However, a market exists for an economical door which retains the advantages of the aforenoted core and panel arrangement as described in the referenced patents, and which door is at the same time decorative in nature and simple in construction.

SUMMARY OF THE INVENTION

This invention contemplates a door assembly including a core sandwiched between front and rear panels. The panels include corresponding portions which surround an opening, and which portions are in spaced relation to each other and have scalloped edges or the like so as to be rendered decorative. An insert is supported on the rear panel behind the opening and a weatherproofing gasket is retained in the space between the front and rear panel portions, and which gasket follows the edges of the portions and is adjacent the supported insert. The insert is thus supported without the usual frame or the like, and the mitered or butt joint appearance of conventional type door inserts is eliminated. The decorative feature is achieved through the scalloped panel edges to eliminate separate decorative members as have heretofore been required.

One object of this invention is to provide a door of the type including front and rear panels having portions in spaced relation and an insert supported on the real panel behind an opening surrounded by portions of said panels, and which door is simpler in construction and more economical to manufacture than doors of the type heretofore known in the art.

Another object of this invention is to provide a door of the type described wherein the portions of the panels surrounding the opening have decorative characteristics to eliminate the need for a separate decorative member as has heretofore been the case.

Another object of this invention is to arrange a weatherproofing gasket in the space between the portions of the panels which surround the opening, and which gasket follows the edges of the panel portions and is adjacent the insert to eliminate the mitered or butt joint appearance of conventional type door openings.

These and other objects and features of the invention are pointed out in the following description in terms of the embodiments thereof shown in the accompanying drawings. It is to be understood however that the drawings are not a definition of the limits of the invention, reference being had to the appended claims for this purpose.

DESCRIPTION OF THE INVENTION

Figure 1:
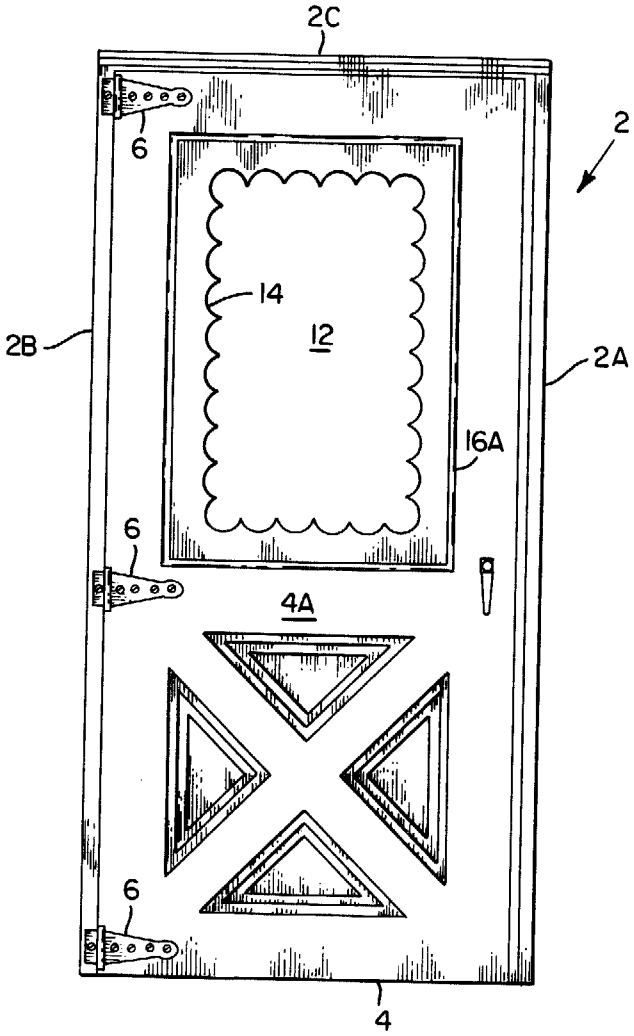
FIG. 1 is a pictorial representation of a door embodying the feature of the invention.

FIG. 1 shows an installation structure 2 having a pair of side members 2A and 2B commonly known in the art and hereafter referred to as Z-bars. Structure 2 has an upper member or rain cap 2C extending across the top and suitably secured to Z-bars 2A and 2B.

Figure 3:
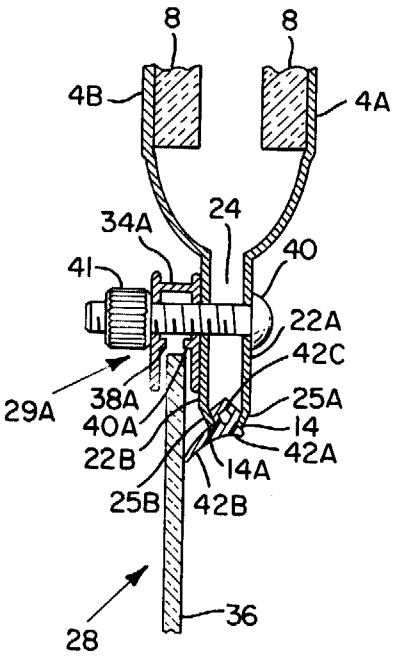
FIG. 3 is a sectioned end view showing one embodiment of the invention wherein an insert is supported in the door opening shown in FIG. 1.
Figure 2:
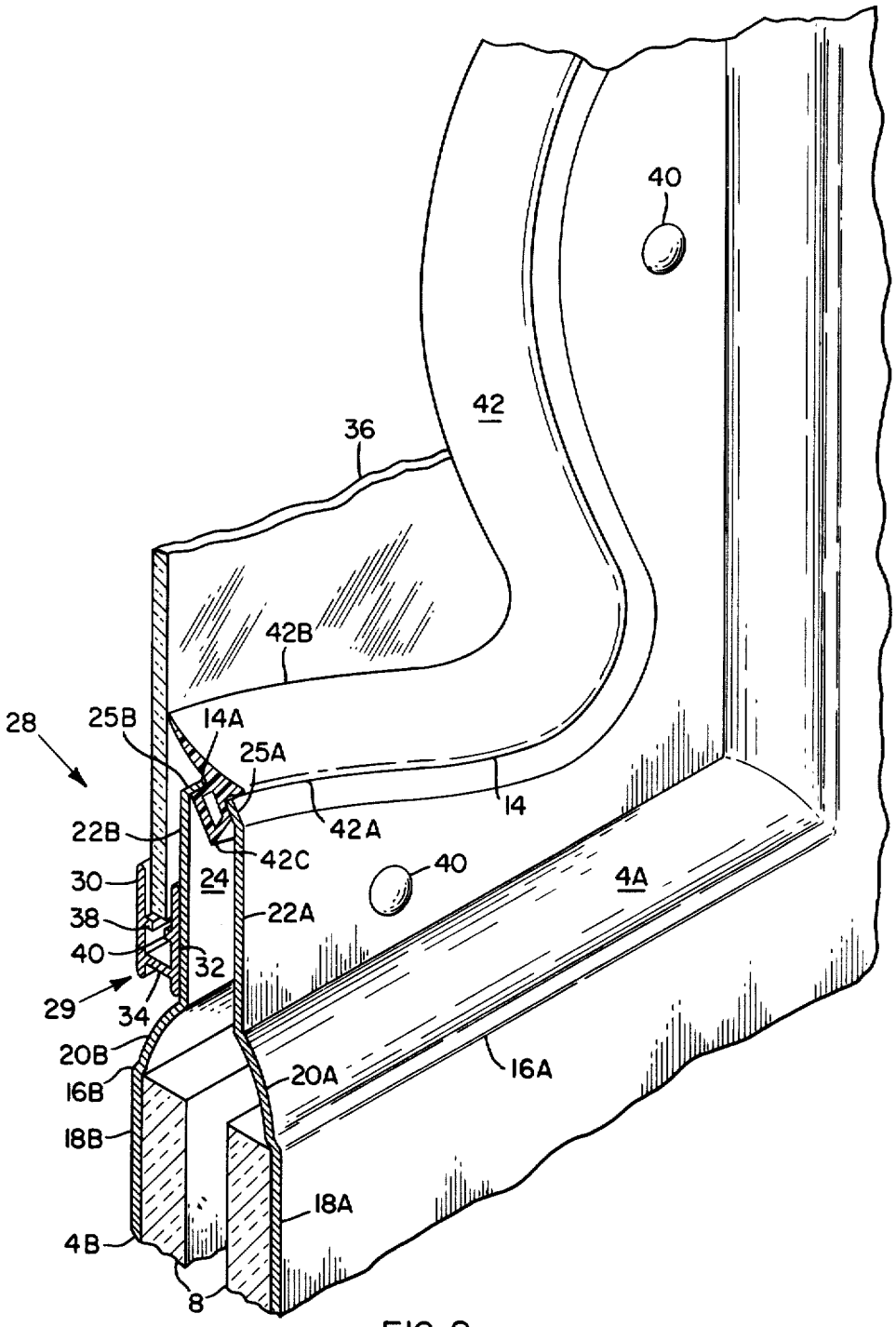
FIG. 2 is an isometric, partly sectioned and view of the door shown pictorially in FIG. 1.

A door assembly 4 according to the invention is hinged by hinges 6 to one of the Z-bars such as the Z-bar 2B. Door assembly 4 includes a one piece front panel 4A shown in FIGS. 1, 2 and 3, a one piece rear panel 4B shown in FIGS. 2, 3, and 4 and core 8 sandwiched between panels 4A and 4B as shown in FIGS. 2 and 3. The lower portions of panels 4A and 4B include embossed designs such as the crossbucks 10 and which portions otherwise serve as kick plates. Alternatively, the lower portions of the panels may be flat and the designs or the like may be suitably fastened thereto. The upper portions of the panels include openings which cooperate upon assembly to form an opening 12 which is shown, for purposes of illustration, as rectangular in FIG. 1. The edges of the upper portions of the panels are scalloped or otherwise shaped or formed to provide a decorative edging 14 which surrounds the opening. The panels are further formed to provide a ledge 16A which cooperates with scalloped edging 14 to define opening 12. An insert, which may be a conventional type screen or glass insert, is retained behind opening 12 as will be described with reference to FIGS. 2, 3 and 4.

It is to be noted that in the preferred embodiment of the invention panels 4A and 4B are one piece stampings of aluminum or steel or some other such suitable metal or aloy or may be of a rigid plastic material, with the method of providing stampings of this size and shape being outside the scope of this invention. It will suffice to say for present purposes that there is thus provided a unitary type panel which eliminates the disadvantages of multimembered panels now known in the art to wit: loosening and breaking of moulding, sagging, splitting, racking, etc.

Core 8 may include suitable separators, structural members and insulating members, and may further include a top cap, a bottom cap and side caps for supporting panels 4A and 4B. All of the aforenoted members and caps may be of a material commensurate with cost and design characteristics and may be nonmetallic when thermal properties are desired or metallic when structural considerations are of prime importance, as the case may be. In this regard core 8 may be of the type described in the aforenoted U.S. Pat. No. 3,599,703.

With particular reference now to FIG. 2, a typical door section shows panels 4A and 4B as including longitudinally extending portions 18A and 18B, respectively, separated by core 8 and terminating in inwardly extending curvelinear portions 20A and 20B, and which curvelinear portions and longitudinally extending portions are separated by ledge 16A on panel 4A and by a corresponding ledge 16B on panel 4B. Curvelinear portions 20A and 20B terminate in longitudinally extending end portions 22A and 22B, respectively, with said end portions separated by a space or gap 24. The edges of longitudinally extending end portions 22A and 22B have inwardly extending lips 25A and 25B, respectively, and which lips are decoratively formed to provide scalloped edges 14 and 14A shown in the figure.

An insert 28, which may be a screen or glass insert but is shown for purposes of illustration as a glass insert, is rectangular in shape and includes top, bottom and a pair of side members which may be a suitable metallic or plastic material. Each member may have a section such as that designated as 29 in the figure and including a pair of parallel, longitudinally extending legs 30 and 32 in spaced relation to each other and separated by a cross-member 34 normal to said parallel legs and near ends thereof for forming a generally U-shaped channel which supports a glass insert panel 36 on shoulders 35 and 40 approximately midway along legs 30 and 32. A generally rectangular channel formed by cross-member 34 and shoulders 38 and 40 retains a key or the like (not shown) wherein the members of insert 28 are affixed to each other for forming a rigid insert as will be understood. Insert section 29 is disposed adjacent longitudinally extending end member 22B of panel 4B just above curvelinear portion 20B with leg 32, for example, abutting panel portion 22B as shown in FIG. 2.

With reference to FIG. 3, wherein a side insert section 29A is shown, threaded stud or like device 40 is affixed to end member 22A of panel 4A and extends through said end member and end member 22B of panel 4B, and through the channel of insert section 29A formed by cross member 34A and shoulders 38A and 40A. Stud 40 may be secured by a suitable device such as a knurled nut 41. It will be understood that rectangular insert 28 has several such fastening devices around the perimeter thereof as better shown in FIG. 2 so that the insert is securely supported on rear panel 4B and behind door opening 12 (FIG. 1) and space 24.

With insert 28 thus supported on door panel 4B, longitudinally extending end portions 22A and 22B of panels 4A and 4B, respectively, extend beyond insert sections 29, 29A as shown in FIGS. 2 and 3, with the portions so extending being separated by space 24 as heretofore noted. A weather proofing gasket 42 which may be endless or of a predetermined length and of a suitable flexible material such as vinyl or the like includes a cap portion 42A, a beveled portion 42B and a retained portion 42C as shown in FIGS. 2 and 3. Gasket 42 is arranged so that retained portion 42C thereof, which may be triangular or arrowhead in shape, is captured between lips 25A and 25B of panel portions 22A and 22B, respectively, so as to be retained in space 24 separating said members 22A and 22B, whereby cap portion 42A of gasket 42 is adjacent lip 25A and beveled portion 42B extends beyond lip 25B and adjacent glass pane 36. Upon assembly, gasket 42 is urged into space 24 as so to follow scalloped edges 14 and 14A around the perimeter of opening 12 to provide a continuous seamless affect as will now be understood.

Figure 4:
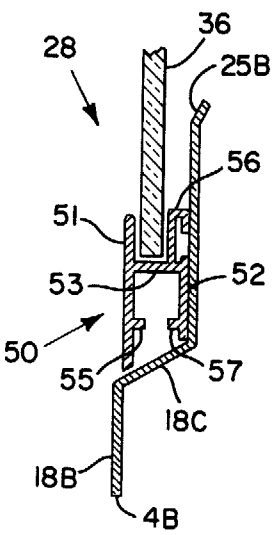
FIG. 4 is a sectioned end view showing another embodiment of the invention wherein an insert is supported in the door opening shown in FIG. 1, and wherein the decorative features of the door are enhanced.

With the features of the invention having now been described, the decorative characteristics of the door so provided may be enhanced as shown in FIG. 4. Thus, panels 4A and 4B may be formed as indicated in the figure, wherein panel 4B is shown for purposes of illustration. Longitudinally extending member 18B terminates in an inwardly extending inclined linear member 18C, and which member 18C terminates in longitudinally extending end member 22B having lip 25B. Insert 28 may include section 50 similar to sections 29, 29A and having parallel legs 51 and 52, with leg 51 being longer than leg 52 so as to be adjacent the lower part of linear member 18C, while leg 52 is adjacent the upper part of said member when insert 28 is supported on panel 4B as heretofore noted. Legs 51 and 52 and a crossbar 53 form a channel for retaining glass insert panel 36, and crossbar 53 and shoulders 55 and 57 retain a key (not shown) in a manner similar to that shown with reference to FIGS. 2 and 3. The upper portion of leg 52 may carry a C-shaped member 56 for retaining weather stripping or the like as is known in art, with reference being had to a similar arrangement described in the aforenoted U.S. Pat. No. 3,727,664.

The arrangement in FIG. 4 is seen to enhance the decorative characteristics of the door in that panel members 18B, 18C and legs 50, 52 of glass insert section 28 now cooperate to provide a more continuous or uninterrupted appearance as will be understood by comparing FIGS. 2 and 4.

It will now be seen from the aforegoing description that the heretofore enumerated objects of the invention have been achieved. A door has been provided which is simple in construction and economical to manufacture, and has highly desirable decorative and structural features not heretofore available.

Although several embodiments of the invention have been illustrated and described in detail it is to be expressly understood that the invention is not limited thereto. Various changes may also be made in the design and arrangement of the parts without departing from the scope and spirit of the invention as the same will now be understood by those skilled in the art. For example, although opening 12 and insert 28 have been described, for purposes of illustration, as rectangular in shape other shapes are within the contemplation of the invention.

What is claimed is:

1. In a door of the type including front and rear panels having corresponding portions surrounding a substantially rectangular opening and a space between said panel portions, the improvement comprising:

an insert supported on the rear panel behind the opening and behind the space between the corresponding panel portions includes top, bottom and a pair of side members, each of said members having a section including a pair of parallel, longitudinally extending legs in spaced relation to each other and separated by a member normal to the legs and near corresponding ends thereof, one of the legs adjacent the rear panel, each of the legs carrying means which divides said legs into first and second portions, the first portions of the legs and the dividing means cooperating to form a first channel, and the second portions of the legs and the dividing means and separating member cooperating to form a second channel; and a gasket arranged in the space, the gasket following the perimeter of the corresponding panel portions and being adjacent the insert.

2. A door as described by claim 1, wherein:

the corresponding panel portions surrounding the opening have decorative edges; and the gasket follows the perimeter of the decorative edges.

3. A door as described by claim 2, wherein:

the decorative edges have inwardly extending lips; and the gasket is captured between the lips.

4. A door as described by claim 3, wherein:

the gasket has a first portion which is captured between the lips, a second portion which is adjacent the front panel portion edge and a third portion which extends beyond the rear panel portion edge and is adjacent the insert.

5. A door as described by claim 1, including:

an insert panel supported in the first channel.

6. A door as described by claim 1, including:

the second channel retaining means for rigidly affixing each of the top, bottom and side members to an adjacent member.

7. A door as described by claim 1, wherein:

the corresponding portions of the front and rear panels surrounding the opening have inwardly extending curvelinear members terminating in longitudinally extending end members; and the one insert section leg is disposed just beyond the curvelinear member and adjacent the longitudinally extending end member of the rear panel portions.

8. A door as described by claim 7, including:

an insert panel supported in the first channel and extending beyond the front and rear panel portion end members; and the gasket arranged in the space between the end members, said gasket following the perimeter of said end members and being adjacent the insert panel.

9. In a door of the type including front and rear panels having corresponding portions surrounding a substantially rectangular opening and a space between the panel portions, an insert supported on the rear panel behind the opening and behind the space between the corresponding panel portions including top, bottom and a pair of side members, each of the members having a section comprising:

a pair of parallel, longitudinally extending legs in spaced relation to each other and separated by a member near corresponding ends of the legs for forming a first channel, one of the legs disposed adjacent the rear panel, and means associated with the legs near the other ends thereof and cooperating with the separating member for forming a second channel; and a gasket arranged in the space, the gasket following the perimeter of the corresponding panel portions and being adjacent the insert.

10. A door as described by claim 9, including:

an insert panel supported in the first channel.

11. A door as described by claim 9, including:

the second channel retaining means for rigidly affixing each of the top, bottom and side members to an adjacent member.

12. A door as described by claim 9, wherein:

the corresponding portions of the front and rear panels surrounding the opening have inwardly extending inclined members terminating in longitudinally extending end members;

the one insert section leg disposed adjacent the longitudinally extending end member of the rear panel portion and adjacent the end of the incline; and the other insert section leg being longer than the one leg and disposed adjacent the beginning of the incline.

13. A door as described by claim 12, including:

an insert panel supported in the first channel and extending beyond the front and rear panel portion end members; and the gasket arranged in the space between the end members, said gasket following the perimeter of said end members and being adjacent the insert panel.

14. A door as described by claim 7, including:

means affixed to the end member of the front panel portion and extending through said member, and extending through the end member of the rear panel portion and through the first channel for securing the insert with the one insert section leg disposed just beyond the curvelinear member and adjacent the end member of the rear panel portion.

15. A door as described by claim 12, including:

means affixed to the end member of the front panel portion and extending through said member, and extending through the end member of the rear panel portion and through the first channel for securing the insert with the one insert section leg disposed adjacent the rear panel end member and adjacent the end of the incline and the other insert section leg disposed adjacent the beginning of the incline.

*16. A door as described by claim 1, wherein:*

*the perimeter of each of the corresponding panel portions defining the opening has an inwardly extending lip and the gasket is captured between the lips of said panel portions.*

*17. A door as described by claim 16, wherein:*

*the gasket has a first portion which is captured between the lips, a second portion which is adjacent the front panel portion perimeter, and a third portion which extends beyond the rear panel portion perimeter for sealing contact with the insert.*

*18. A door as described by claim 1, wherein:*

*the panels are one piece panels; and*

*the corresponding panel portions surrounding the opening are provided in the upper parts of the one piece panels and the lower parts thereof have areas which serve as kickplates.*

*19. A door as described by claim 18, wherein:*

*the kickplate areas in the lower parts of the one piece panels carry designs.*

*20. A door as described by claim 19, wherein:*

*the designs are embossed in the kickplate areas of the one piece panels.*

*21. A door as described by claim 19, wherein:*

*the designs are secured to the kickplate areas of the one piece panels.*

* * * * *